United States Patent [19]

Forsha

[11] Patent Number: 5,094,139

[45] Date of Patent: Mar. 10, 1992

[54] DESOLDERING BRAID

[75] Inventor: Alan L. Forsha, Upland, Calif.

[73] Assignee: Solder Removal Company, Covina, Calif.

[21] Appl. No.: 485,104

[22] Filed: Feb. 26, 1990

[51] Int. Cl.⁵ ............................................. D04C 1/06
[52] U.S. Cl. ........................................... 87/9; 87/56; 228/19
[58] Field of Search ................... 87/1, 9, 44, 56, 57, 87/61, 62; 228/19, 20, 35, 264

[56] References Cited

U.S. PATENT DOCUMENTS

| | | | |
|---|---|---|---|
| Re. 32,086 | 2/1986 | Spirig | 228/19 |
| 1,493,782 | 5/1924 | Klein | 87/44 |
| 3,474,703 | 10/1969 | Davis et al. | 87/1 |
| 3,627,191 | 12/1971 | Hood | 228/19 |
| 3,715,797 | 2/1973 | Jackson et al. | 228/19 X |
| 3,892,161 | 7/1975 | Sokol | 87/44 X |
| 4,164,606 | 8/1979 | Spirig | 228/19 X |
| 4,765,220 | 8/1988 | Iannucci et al. | 87/57 |

Primary Examiner—Joseph J. Hail, III
Attorney, Agent, or Firm—Nilsson, Robbins, Dalgarn, Berliner, Carson & Wurst

[57] ABSTRACT

A desoldering wick which comprises a small number (e.g., three) of strands of a thin wire (i.e., having a diameter less than about 0.002") braided together to form a hollow tube which is subsequently flattened. Such a wick is suitable for use in desoldering operations for which the heretofore available products were too large, and provides a more rapid removal of molten solder than is achieved with the prior art products. Methods and apparatus are also provided which enable the manufacture of desoldering wicks comprising fewer strands of wire and/or wire of a substantially smaller diameter than has heretofore been possible. By modification of conventional apparatus to reduce the substantial drag on the wire strands heretofore encountered during the braiding operation, it is now possible to prepare wicks with thicknesses on the order of about 0.008" from wire having a substantially smaller diameter (i.e., less than 0.002") than was previously feasible.

1 Claim, 2 Drawing Sheets

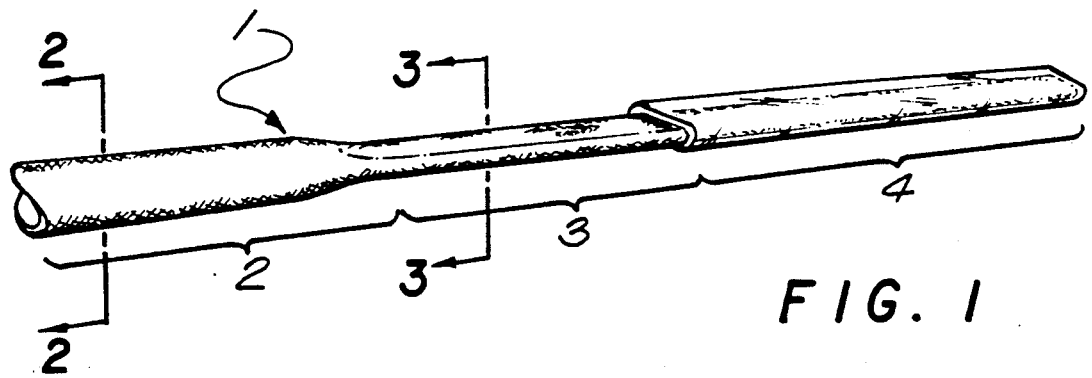
FIG. 1
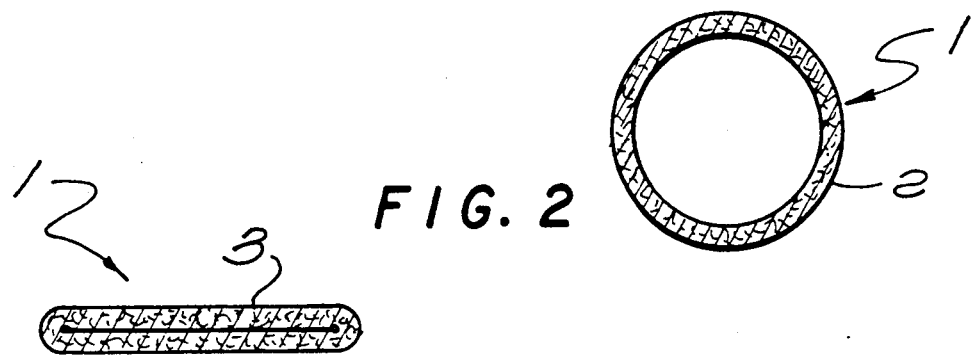
FIG. 2
FIG. 3
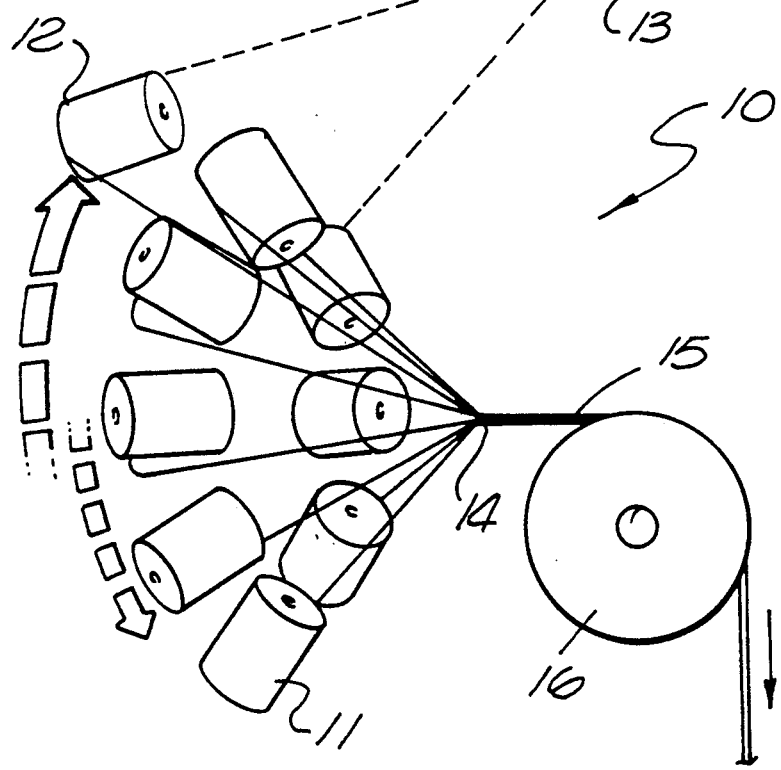
FIG. 4

DESOLDERING BRAID

BACKGROUND OF THE INVENTION

This invention relates to an improved desoldering braid for use in removing solder from soldering joints, and to apparatus for use in the manufacture of such braid.

Solder-pulling wicks in the form of a desoldering braid have been in use for some time to remove solder from a soldered connection quickly and economically. Such wicks have been made of metal strands or wires braided to provide a capillary surface. Such wicks have generally been made of copper, in view of its heat-conducting properties. In some instances, flux is applied to the solder connection prior to contact with the wick in order to improve the wetting properties of the solder. Alternatively, desoldering braid has been provided with an overcoating of flux. Exemplary solder wicks are described in U.S. Pat. No. 3,627,191 to Hood, Jr., U.S. Pat. No. 3,715,797 to Jackson et al. and U.S. Pat. No. Re. 32,086 to Spirig, the disclosures of which are hereby incorporated by reference.

As indicated in the above patents, in use the solder wick is placed on the solder connection and heat is applied to the wick and/or the solder. The solder melts and is drawn up onto the wick by capillary forces.

Hood describes a braid of 40 A.W.G. gauge (about 0.0031" diameter) copper wire with strands in groups of four. The wick is braided from a machine having 16 heads so that the wick is 64 strands thick.

Spirig describes a wick of knitted construction comprising at least one strand of copper, wherein each strand has a diameter within the range of 0.1 mm to 0.25 mm (about 0.0039" to about 0.0097"). According to Spirig, with a copper strand of less than 0.1 mm diameter the knitting process may be too slow and there is a risk of strand breaks.

In the above-noted U.S. Pat. No. 3,627,191, Hood does suggest the use of strands of 44 gauge wire as a possible alternative in the construction of solder removal wicks. In this proposed alternative, however, the 44 gauge wire is braided "in 16 groups of six strands," for a total of 96 strands per braid. Applicant is aware of no commercial product which has been prepared in accordance with this alternative proposed in Hood. In practice, the lower limit for wire thickness in commercial products has been 42 gauge wire (about 0.0025" diameter).

A particular problem presented with the available soldering wicks relates to their relatively substantial width dimensions, which is a function of several factors including the gauge of the wire and the number of strands employed. A proper braid size must be utilized in any given solder removal operation in order to optimize the removal effect. Whereas a small braid used on a large connection does not remove all of the solder, a large braid on a small connection may remove too much. In particular, the available soldering wicks have all been too wide for use in the desoldering of so-called surface mount devices, which employ very thin leads (typically, 0.005 to 0.010") spaced relatively closely to one another. Thus, conventional wicks of standard width generally bridge 2-5 leads of a typical surface mount device at a time. This makes selective desoldering of any one of these leads extremely difficult, if not impossible, without bridging to additional leads.

A further problem presented with the prior art wicks relates to the generation of excessive heat when the wick and/or solder is brought into contact with a soldering gun and the solder is melted. If the molten solder is not picked up quickly by the wick, substantial quantities of heat can be introduced into the body of a device with which the leads being desoldered are associated. In particular, many devices comprising frames or other elements of synthetic plastic materials may suffer serious damage during the course of desoldering operations, if the molten solder is not removed rapidly.

One approach to reducing the amount of heating time required to raise the wick to a sufficiently high temperature to result in the melting of the solder is to reduce the amount of copper in the wick. For example, Spirig suggests the use of an open-mesh structure prepared by "weaving, stranding, braiding, knitting or crochetting"; the preferred process involves the use of a knitting machine, which results in the aforementioned lower wire diameter limit of 0.1 mm. Moreover, to the best of applicant's knowledge, a product with a diameter approaching the lower width limit of 2 mm (about 0.078") and having an open mesh structure as proposed by Spirig has not been commercially available. In any event, it is not believed that a product comprising a limited number of strands of an extremely thin wire could be prepared using a knitting process of the type described by Spirig on a commercial scale.

The most commonly available type of wick has been of the braided variety, comprising a plurality of wires braided together to form a hollow tube, which is subsequently flattened to provide the final product. Such wicks are prepared using various types of braiding equipment which are well known in the art. For preparation of the braided soldering wicks as described, for example, in Hood, an exemplary system is available under the designation 12 Carrier "Wardwellian" Rapid Braider from Wardwell Braiding Machine Company, Central Falls, R.I. Such braiding machines are also available equipped with 16 and 24 braid ribbon carriers.

While the available braiding machines have proved generally suitable for preparation of desoldering wicks using wires of a substantial gauge (e.g., the 40 gauge wire employed according to Hood), such apparatus has not been suitable for use in the preparation of products comprising thinner wires (for example, 44 gauge). In particular, substantial breakage of the thinner gauge wire during the braiding operation has prevented the introduction of wicks comprising a limited number of strands (e.g., three) of relatively thin (e.g., 44 gauge) wire as would be suitable for use in desoldering operations involving thin or closely-spaced leads.

It is an object of the present invention to provide a desoldering wick which is suitable for use in desoldering operations where a rapid removal of solder from thin or closely-spaced leads is necessary to prevent potential damage to associated equipment.

It is a further object of the invention to provide methods and apparatus which are suitable for the manufacture of such desoldering wicks.

SUMMARY OF THE INVENTION

In accordance with a first aspect of the present invention, there is provided a desoldering wick which comprises a small number (e.g., three) of strands of a thin gauge (e.g., 44 gauge) wire braided together to form a hollow tube which is subsequently flattened. It has been determined that such a wick is not only suitable for use in desoldering operations for which the heretofore available products were too large, but also provides a more rapid removal of molten solder than is achieved with the prior art wicks.

In accordance with another aspect of the present invention, methods and apparatus are provided which enable the manufacture of desoldering wicks comprising fewer strands of wire and/or wire of a substantially smaller diameter than has heretofore been possible. In particular, it has been determined that by modification of conventional apparatus to reduce the substantial drag on the wire strands heretofore encountered during the braiding operation, it is possible to prepare wicks with thicknesses ranging to about 0.008" and having the aforementioned advantageous properties from wire having a substantially smaller diameter (i.e., less than 0.002") than was previously feasible.

BRIEF DESCRIPTION OF THE DRAWINGS

FIG. 1 is a perspective view of a length of braided wire illustrating the formation of desoldering braid in accordance with the present invention;

FIG. 2 is a sectional view taken along line 2—2 of FIG. 1;

FIG. 3 is a sectional view taken along line 3—3 of FIG. 1;

FIG. 4 is a diagrammatic presentation of a high speed braiding machine; and

DETAILED DESCRIPTION OF THE INVENTION

Figure 5:
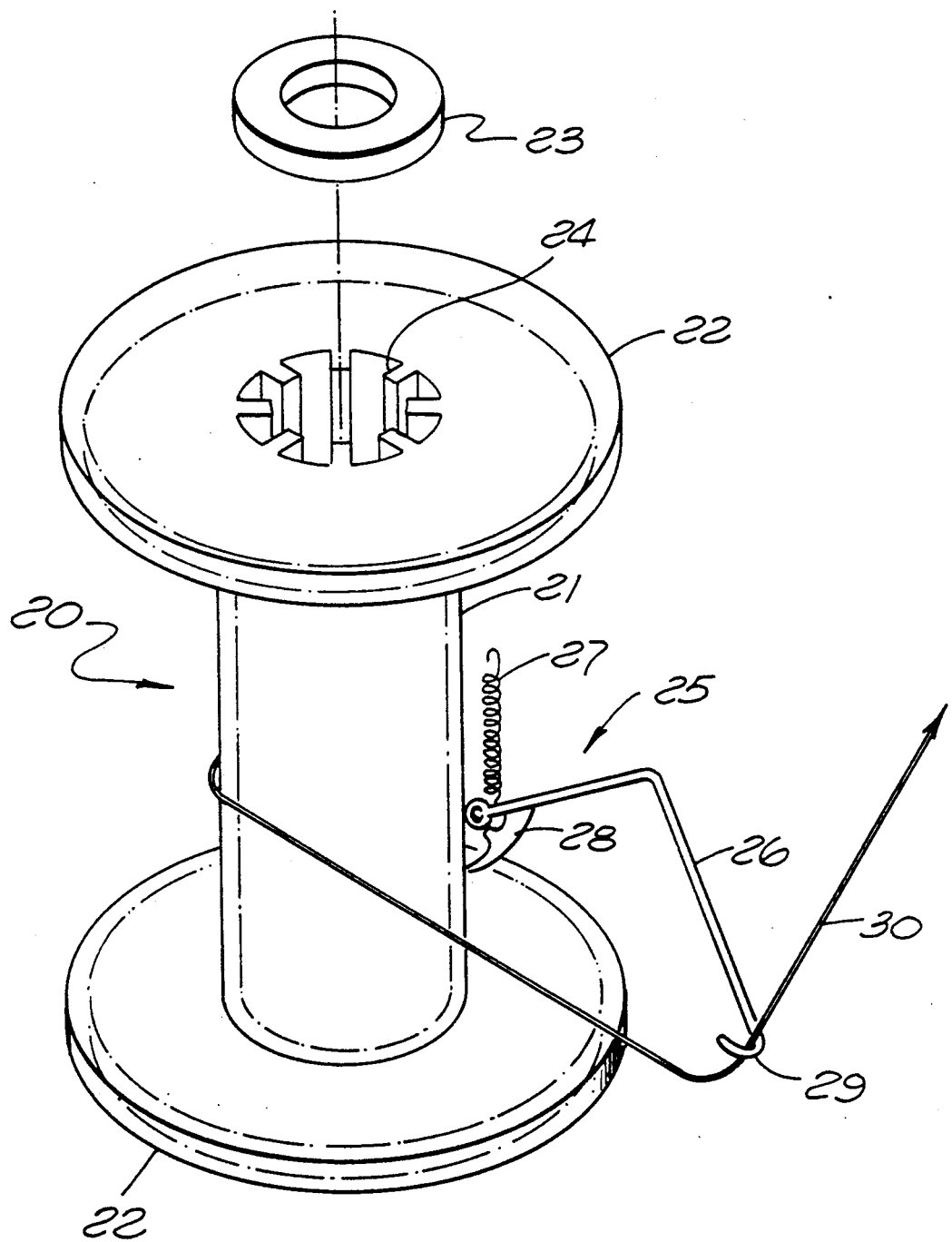
FIG. 5 is an illustration of the bobbin and tension arm arrangement employed in the high speed braiding machine of FIG. 4.

The improved desoldering wick of the present invention is employed in conjunction with a soldering iron of known construction. A length of wick is generally positioned at or near a quantity of solder to be removed, for example from a soldered lead on a circuit board. The tip of the soldering iron is operated at an elevated temperature (on the order of 800° F.) and consequently heats the solder to a temperature at which the solder becomes molten and is drawn into the braid by capillary action. The tip of the soldering iron and the braid are then lifted quickly from the board. The braid retains the unwanted solder; the solder-filled portion is subsequently clipped from the usable length to provide a fresh piece at the end.

The novel desoldering wick of the present invention comprises a limited number (e.g., three) of strands of wire formed into braiding ribbons, which in turn are braided into the form of a hollow tube. Thus, unlike a product as described by Hood comprising groups of four to six strands, the desoldering wick of the present invention comprises no more than three strands per group. As a consequence, the metallic content of the finished braid is substantially reduced and the apparent openness of the weave is increased. As discussed below, this modification has a favorable impact on the resultant properties of the product.

In addition, according to the present invention the diameter of the wire employed is reduced substantially from the conventionally employed 40 gauge (0.0031 inch) to 44 gauge (0.00197 inch). The finished braid (as prepared using a Wardwell 12 carrier braiding machine) has a width of only 0.022" and a thickness on the order of 0.008". Wicks prepared from such a braid may be employed in contexts (such as the desoldering of leads for surface mount components) where the previously available materials would clearly be unsuitable.

As shown in FIG. 1, the braid 1 is prepared in the form of a hollow tube (illustrated in section 2). The hollow tube is subsequently flattened (as illustrated in section 3) to provide a flat ribbon configuration. Thereafter, for use in some contexts, the flattened ribbon is coated with a suitable fluxing agent to provide a flux-coated wick (as illustrated in section 4). In addition to fluxing compositions as disclosed in the above-referenced patents and as generally known in the art, a particularly suitable water soluble fluxing composition is disclosed in copending U.S. application Ser. No. 07/485,354 filed concurrently herewith in the name of Donald C. Atkins and assigned to the same assignee as this application. FIG. 2 illustrates a cross-section of the tubular portion 2, whereas the resultant flattened ribbon of section 3 is depicted in cross-section in FIG. 3.

A significant aspect of the improved desoldering wick of the present invention is that the improved wick acts significantly faster than prior art braids to remove molten solder. It is of course desirable to minimize the dwell time of the tip of a soldering iron on undesired solder which is in contact with electrical components and/or structural elements (for example, a circuit board) so as to minimize the potential for heat damage due to a transfer of heat from the molten solder. Using a reduced number of strands of the smaller-diameter wire in the improved braid has been found to result in substantial reductions in dwell time relative to prior art materials. This result is due not only to the reduced mass of the braid per unit length, but also to the more open structure which is achieved by using fewer strands in the braiding process. In view of the reduction in mass, the braid may be more rapidly heated to the melting temperature of the solder; as a result, the dwell time of the hot tip of the soldering iron on the workpiece is reduced. The reduction in the thickness and number of strands used to form the braid, moreover, leads to the generation of a wick wherein the density of wire strands per unit area is decreased relative to the prior art products. As there is additionally the advantage of an overall decrease in the width of the desoldering wick which permits the use thereof where prior art products have been unsuitable, the novel product of the invention provides significant advances over the materials previously available.

As previously noted, a significant obstacle which effectively prevented prior attempts to utilize relatively thin (e.g., 44 gauge) wires in the preparation of braid has been wire breakage. With reference to the generalized braiding device 10 illustrated in FIG. 4, braid ribbons are provided from upper carriers 11 and lower carriers 12 comprising spools of braid ribbons to be braided, with the carriers in respective circular arrays; for clarity, only one representative lower carrier is depicted. Each set of carriers revolves around the central axis of its configuration; the upper carriers 11 revolve as a group in a first direction (counterclockwise in the embodiment illustrated), while the lower carriers 12 revolve in an opposite (in this case, clockwise) direction. By means of guide mechanisms 13 (described in greater detail below), braid ribbons from both sets of carriers are drawn to a braiding point 14; thus, under control of the guide mechanisms 13, the braid ribbons from both sets of carriers are merged into a tubular braid 15 at braiding point 14. The finished braid 15 is advanced for further processing by a take-up reel 16.

Braiding apparatus as heretofore employed has generated sufficient drag on the braiding ribbons such that the tensile strength required of the ribbons and/or wires comprising these ribbons has been substantial. In particular, using a conventional braiding apparatus (such as a Wardwell 12 carrier braider) the amount of drag to which a braiding ribbon is subjected has been on the order of six to seven ounces; this amounts to a force in excess of about two ounces per wire, in the limiting case of a three-wire strand. In order to withstand such a force, it has been necessary to employ wire of a thickness corresponding to at least gauge 42 (0.00249" diameter). As gauge 44 wire is able to withstand only a drag corresponding to about 0.99 ounces, it is readily apparent that using the conventional braiding equipment, at least nine strands of such wire per braid would have heretofore been necessary for successful production of a braid with an excess tension safety factor.

In accordance with another aspect of the present invention, it has been determined that in order to reduce the amount of drag to which a braid ribbon is subjected, it is expedient to modify the conventional braiding apparatus (such as the exemplary 12 Carrier "Wardwellian" Rapid Braider) in a number of significant respects. Thus, in place of the conventional bobbins employed as upper carriers 11 and lower carriers 12, in accordance with the invention novel bobbins which have a substantially reduced weight are employed. Whereas the conventional bobbins have a weight on the order of 2.56 ounces, the modified bobbins, have been reduced in weight to about 1.25 ounces.

This significant reduction in weight is achieved in one preferred embodiment by machining so as to remove material from the conventional bobbins as customarily employed with the braiding equipment. As illustrated in FIG. 5, a conventional bobbin 20 comprises a hub portion 21 and end portions 22. By removing material from hub portion 21 and end portions 22 (as indicated by the broken lines in FIG. 5), the weight of the bobbin may be significantly reduced. To ensure an appropriate fit and maintain the security of the bobbins during rotation, it is generally appropriate to add one or more additional retaining washers 23 to compensate for the reduction in the height of the thus-modified bobbins due to the machining and to maintain bobbin alignment integrity on the respective bobbin keeper shafts (not illustrated). Alternatively, in accordance with another embodiment customized bobbins which have been designed to eliminate excess mass relative to the conventional bobbins may be employed; in particular, it is advantageous to eliminate the internal ribs 24 provided in the core of the hub 21 so as to achieve a substantial weight reduction.

Further in accordance with this aspect of the invention, it has also been determined that the drag on the braiding ribbons may be significantly reduced by suitable modification of the guide mechanisms as are conventionally employed in standard braiding apparatus (for example, the aforementioned 12 Carrier "Wardwellian" Rapid Braider). Specifically, it has been determined that the feed guides 25 (and in particular, the tension arms 26 thereof) used to direct the braiding ribbons to the braiding point may be successfully employed in conjunction with spring means 27 modified so as to produce substantially less tension in the braiding ribbons. By elongation of the spring means 27 (for example, on the order of about 25% in the exemplary system), the tension on the braiding ribbon may by reduced significantly. To ensure proper operation of the electromechanical protective actuator 28 designed to shut off the apparatus in the event of breakage of the spring means 27, a nominal amount of residual tension is nonetheless required. For example, in a conventional Wardwell braiding apparatus with 12 braiding ribbon carriers, it has been determined that the spring tension may be reduced to less than 1 ounce by using elongated springs; however, in order to permit proper functioning of the protective device, the tension must be maintained above about 0.5 ounces.

As a further expedient for reducing tension, the curved tip 29 of each tension arm 26 may advantageously be modified so as to increase the radius thereof. This enlargement of the tip 29 of the tension arm 26 (for example, from a typical standard radius of 1/32" in the exemplary system to a radius of about 1/16") provides an additional reduction in drag by permitting the braiding ribbon 30 to pass over a larger area rolling surface.

As a result of the specific modifications described above, it has been possible to reduce the amount of drag encountered by the braiding ribbons substantially. For example, by decreasing the weight of the bobbins from 2.56 ounces to approximately 1.25 ounces and modifying the guide mechanism in the manner indicated above, it is possible to reduce the amount of drag to which the braiding ribbon is subjected from about 6-7 ounces to less than 3 ounces. This corresponds to a decrease in operating tensions to less than one ounce per strand. As a consequence, it is now possible to prepare braid in accordance with the present invention from ribbons comprising as few as three strands of 44 gauge wire without substantial breakage.

From the foregoing description, one skilled in the art can readily ascertain the essential characteristics of the invention and, without departing from the spirit and scope thereof, can adapt the invention to various usages and conditions. Changes in form and substitution of equivalents are contemplated as circumstances may suggest or render expedient, and although specific terms have been employed herein, they are intended in a descriptive sense and not for purposes of limitation.

What is claimed is:

1. A process for producing desoldering braid which comprises the steps of:
    (a) selecting a plurality of strands of wire;
    (b) grouping said strands of wire into braiding ribbons wherein each said braiding ribbon comprises no more than three strands of wire each having a diameter no greater than about 0.002";
    (c) supplying said braiding ribbons from two sets of carriers, wherein a first plurality of carriers comprises bobbins having a weight of about 1.25 ounces rotating in a first direction and a second plurality of carriers comprises bobbins having a weight of about 1.25 ounces rotating in a second opposite direction;
    (d) guiding said braiding ribbons from said two sets of carriers by a guide mechanism including tension arms which maintain said braiding ribbons at a predetermined reduced tension of about less than 1 ounce and above about 0.5 ounces;
    (e) braiding said braiding ribbons together at a braiding point to form a tubular braid; and
    (f) flattening said resultant tubular braid.

* * * * *